(No Model.)
S. C. DREW.
APPARATUS FOR OBSERVING ECLIPSES.
No. 548,868.  Patented Oct. 29, 1895.
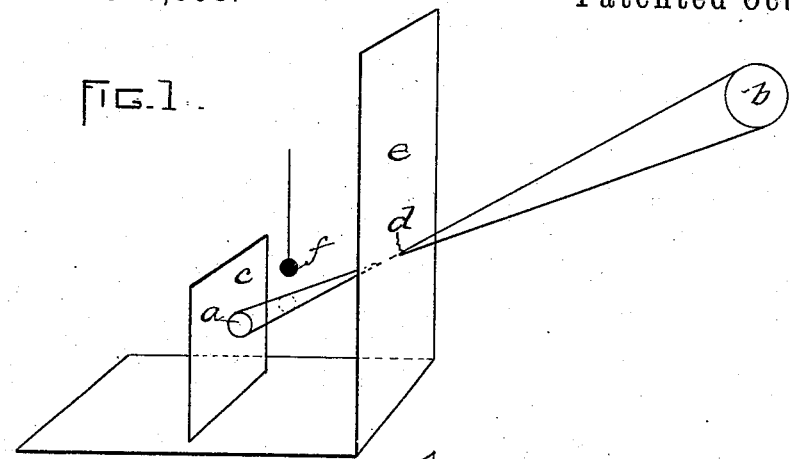
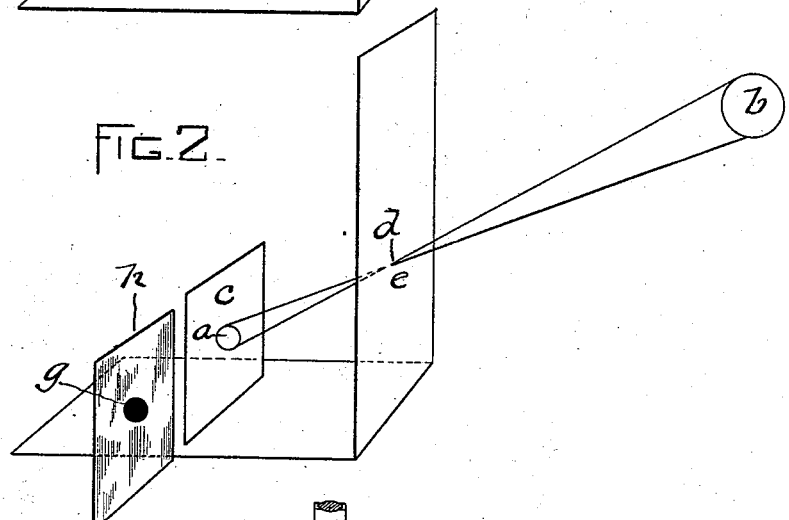
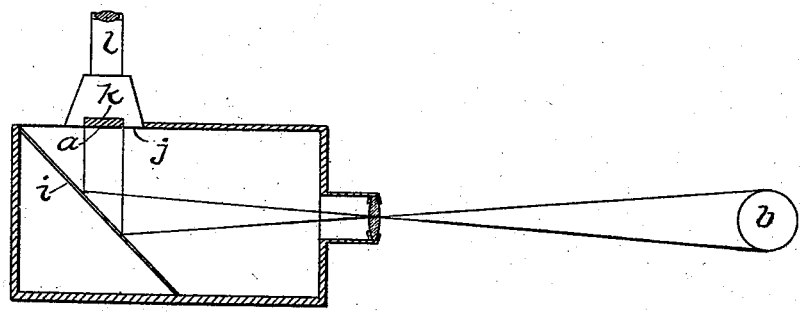
WITNESSES
A. D. Harrison
U. P. Abell
INVENTOR:
S. C. Drew.
By Wright, Brown Kerosley.
Att'ys.

UNITED STATES PATENT OFFICE.

STEPHEN C. DREW, OF BOSTON, MASSACHUSETTS.

APPARATUS FOR OBSERVING ECLIPSES.

SPECIFICATION forming part of Letters Patent No. 548,868, dated October 29, 1895.

Application filed May 7, 1894. Serial No. 510,289. (No model.)

*To all whom it may concern:*

Be it known that I, STEPHEN C. DREW, of Boston, in the county of Suffolk and State of Massachusetts, have invented certain new and useful Improvements in Apparatus for Observing Eclipses, of which the following is a specification.

This invention relates to an improved apparatus for observing the phenomena accompanying an eclipse of the sun; and it consists in the novel features of construction and relative arrangement of parts, fully described in the specification, clearly illustrated in the drawings, and particularly pointed out in the claims.

In carrying out my invention I make use of the well-known fact that if a room is darkened so that no light can enter save by a small aperture the images of objects within the line of the aperture may be cast upon a screen within the darkened room, in accordance with the principle involved in the "camera obscura," an old and well-known instrument. I in substantially the same manner form an exact image of the sun upon a screen in a darkened room or other chamber or on the screen of a camera. Having thus obtained the image, and taking care that no other light than that from the sun's image is present, I interpose between the image and the eye an opaque object of the size of the sun's image. The corona and other phenomena at once become visible around the eclipsing object and enable me then by use of powerful magnifying-glasses or other instruments to observe at my leisure such phenomena, which are exactly the same as the phenomena produced by a total solar eclipse.

The foundation principle of my invention is therefore simply to form an image of the sun in a darkened room, chamber, or other compartment and then to eclipse the said image.

There are various ways in which the sun's image may be formed upon a screen or other substance, as there are also various ways by which the image formed may be eclipsed. For example, as is shown in Figure 1 of the drawings, the image $a$ of the sun (indicated by $b$) may be thrown upon the screen $c$ through the small aperture $d$, formed in the wall $e$, and the eclipsing of the image may be effected by moving a ball or globe $f$, of a size just sufficient to eclipse the image, across the line between the image on the screen and the aperture $d$.

In Fig. 2 the eclipsing object is shown as an opaque disk $g$, formed on a transparent slide $h$, so that it can be moved over the image $a$ on the screen and still permit of a full examination of the corona and other phenomena attendant upon an eclipse.

In Fig. 3 a camera obscura is employed, in which the sun's image may first be formed upon a mirror $i$ and be by it reflected upon a ground glass or other suitable screen $j$ and then eclipsed by moving an opaque disk $k$ over the image to eclipse the same, so that the phenomena may be examined through the tube $l$ above, or the disk $k$ may be fastened to the center of the screen and the sun's image brought into the desired position behind it by a proper moving of the camera. I do not, however, confine myself to any particular substance for forming the screen, as the latter may be a liquid, vapor, or solid substance, or even the air, and any suitable manner of eclipsing the image formed or of forming said image may be employed within the scope of my invention. I furthermore do not confine myself to the use of my invention solely for the examination of phenomena in connection with the sun and the eclipse of the same, since it is obvious that it is applicable for use in examining eclipses of other celestial bodies as well.

I am aware that in the telescope, spy-glass, and other object-glasses the image of the object is formed in the air, as it were, in small size near to the eye and then magnified by the glass through which the eye observes it. I am not aware, however, that prior to my invention it has been proposed to interpose an object between the image and the eye in the manner I have described and for the purpose I have named.

In certain of my experiments I have made use of an eclipsing medium of such a degree of density as not entirely to shut out the disk of the sun's image, but to allow it to be seen, though dimly, somewhat as the sun is seen through a smoked glass. At such times the corona has shown itself, although more vaguely than when the image was entirely obscured, and I am of the opinion that it will be a valuable addition to the study of the sun's constitution to thus be able to compare the dim light of the sun's imperfectly-obscured disk side by side with that of the corona. In this case it is better to use an eclipsing object somewhat larger than the image, so as to have a darkened rim between the image of the sun and the corona. By use of the methods just stated I obtain results not attainable even by means of a total eclipse of the sun.

I have dwelt more particularly on the corona of the sun because I am aware that there is a method by which the other phenomena may be studied by the aid of the spectroscope, while there exists, so far as I am aware, no method of examining or in any way studying the corona save by a total eclipse or by my method, as stated in this specification. I am convinced, also, that so far as the other phenomena are concerned my method is by far the best, as by it all the phenomena can be seen together and in their relations with one another exactly as they exist, while in the spectroscopic method all other phenomena are necessarily shut out, the prisms used absorbing all light proceeding from the sun except that of the rose-colored prominences.

I declare that what I claim is—

1. A device for use in observing phenomena accompanying an eclipse consisting of a compartment provided with an aperture, a screen arranged in said compartment upon which the image formed by the rays of light that pass through said aperture may be projected, and means to eclipse the central portion of said image thrown upon said screen, substantially as and for the purpose set forth.

2. A device for use in observing phenomena accompanying an eclipse, comprising in its construction a suitable receptacle or casing provided with an aperture, a mirror arranged in said casing at an angle to said aperture and arranged to reflect a ray of light at an angle to said aperture, a movable screen in said casing arranged at right angles to the direction of the rays reflected by said mirror, an opaque disk upon said screen arranged to intercept the image reflected by said mirror and an opening in said casing for observing said screen, substantially as and for the purpose set forth.

In testimony whereof I have signed my name to this specification, in the presence of two subscribing witnesses, this 1st day of May, A. D. 1894.

STEPHEN C. DREW.

Witnesses:
ARTHUR W. CROSSLEY,
A. D. HARRISON.